Dec. 13, 1966  F. C. GLEASON  3,291,338
AUTOMATIC WAREHOUSE ESCAPEMENT APPARATUS
Filed Jan. 2, 1964  2 Sheets-Sheet 1
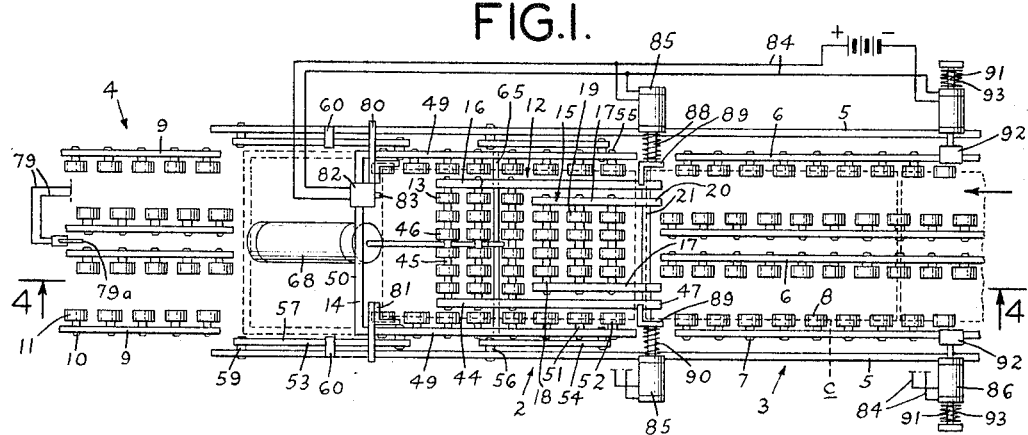
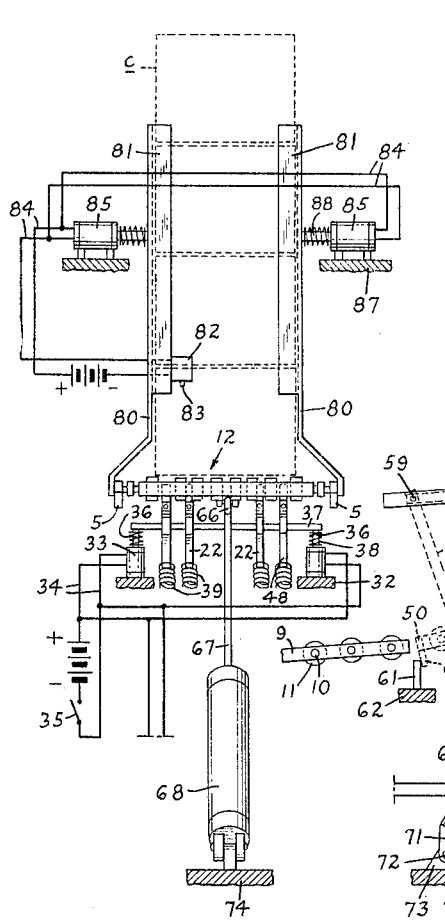
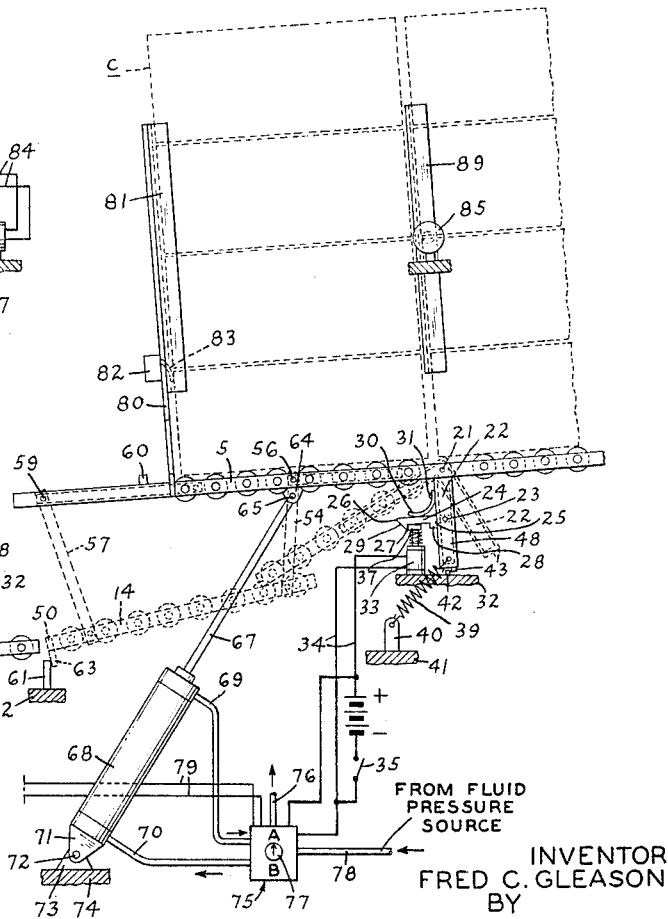
INVENTOR
FRED C. GLEASON
BY
Andrew Kafko
ATTORNEY Dec. 13, 1966   F. C. GLEASON   3,291,338
AUTOMATIC WAREHOUSE ESCAPEMENT APPARATUS
Filed Jan. 2, 1964   2 Sheets-Sheet 2
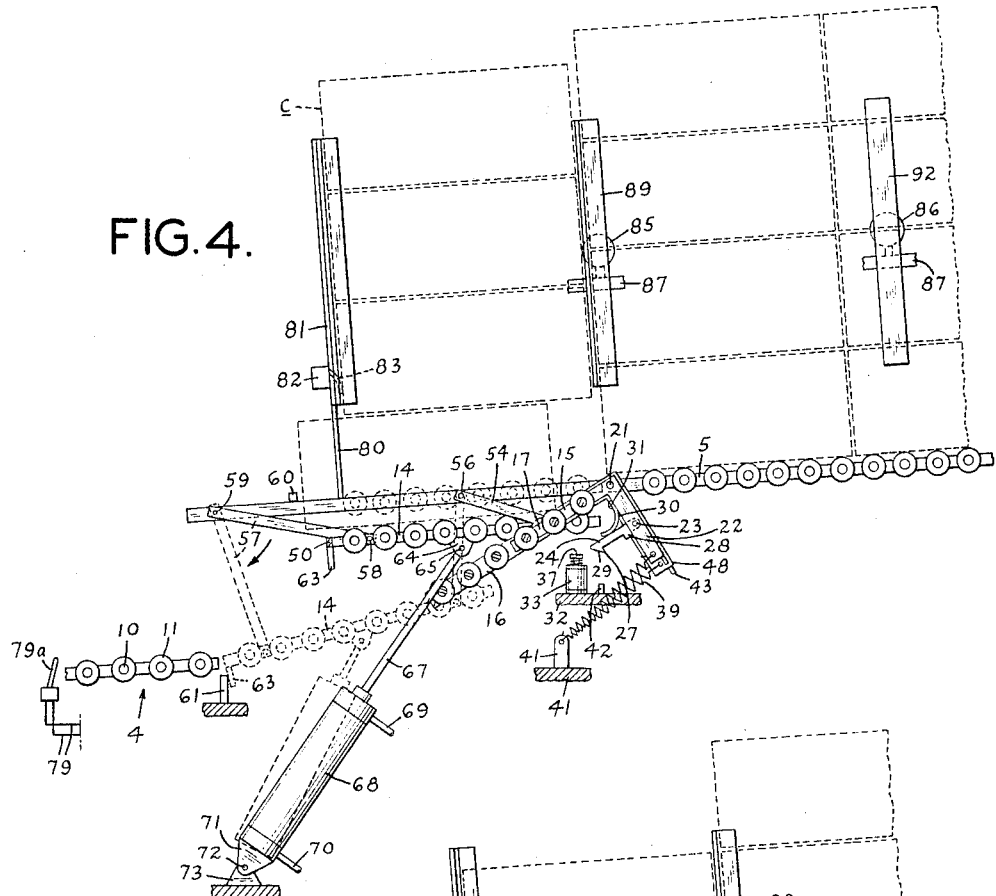
INVENTOR
FRED C. GLEASON
BY
Andrew Kafko
ATTORNEY 3,291,338
AUTOMATIC WAREHOUSE ESCAPEMENT
APPARATUS
Fred C. Gleason, Cannondale, Conn., assignor to American Home Products Corporation, New York, N.Y., a corporation of Delaware
Filed Jan. 2, 1964, Ser. No. 335,191
18 Claims. (Cl. 221—11)

This invention relates generally to case-dispensing devices for warehouses and more particularly to an escapement means for unloading a single case of goods at a time from a stock thereof upon demand, as in an automatic warehouse.

An automatic warehouse is a warehouse in which orders are automatically picked, assembled and delivered to the shipping area. This automatic operation is usually accomplished by sensing devices which sense case quantities and items (or bin location) from prepunched tabulating cards for actuating an escapement device. The latter selects a single case from a supply thereof and delivers the selected items by means of gravity and/or conveyors to the shipping area, such as a shipping platform.

At present, installation of automatic warehouses are so expensive that the cost must be reckoned as having as much as a three to five year amortization. This is generally too high for acceptance by potential users. In reckoning costs of these automatic warehouses, a rough approximation of cost distribution indicates the following:

| | Percent |
|---|---|
| Storage conveyors | 35 |
| Escapements | 10 |
| Collection conveyors | 5 |
| Card sensing device | 10 |
| Memory | 25 |
| Wiring | 15 |

At present, because of the inherent limitations in the selection function of the escapement devices available, storage conveyors store only a single layer of cases. This arrangement consumes three to five times the conveyor area that would be necessary if loads of cases could be storable one upon another; i.e., if the conveyors could permit stacking of cases but, at the same time, would also assure, with the use of a comparatively simple escapement mechanism, the requisite single case release function as in the aforsesaid conventional automatic warehouse single layer arrangement. Thus, fewer storage conveyors and escapement devices would be required and result in reduction of costs of the escapements and storage conveyors by an appreciable amount. This would be of extreme importance towards reducing the overall cost, since as shown above, the cost of storage conveyors and escapements represents almost one-half the total cost of the usual entire automatic warehouse system.

In view of the foregoing disadvantages and drawbacks of the prior art automatic warehouse escapement systems, it is a primary object of the present invention to provide an escapement device which, upond demand, automatically unloads a single case of goods at a time from the bottom of a column or stack of cases.

Another object of the invention is to provide an escapement device which, after unloading a case therefrom, resets automatically for subsequently unloading cases on demand as long as any case of the stack thereof is still supported by the device.

It is yet another object of the invention to provide such a device which handles adjacent columns or stacks of cases completely automatically upon demand thereafter.

It is another object of the invention to provide an escapement device which functions without damaging the cases or the contents thereof.

Yet another object of the invention is to provide an escapement device in which the stacks move downwardly and also forwardly to permit continuity of unloading without disturbance of the original stacking relationship of the cases thereof.

It is another object of the invention to provide such a device which requires a minimum amount of power for operation and relies greatly upon the forces of gravity and biasing means in performing its intended functions.

The foregoing and other objects and advantages of the present invention are achieved by an automatic escapement device which, in accordance with the present invention, is adapted to support a stack of cases and generally comprises: a composite floor, in turn comprising a retaining floor section and a discharge floor section; wherein pivotal means mount the retaining floor section at its rear; releasable locking means are provided for maintaining the retaining floor section in upper, generally horizontal case-supporting position actuatable means are provided for releasing the locking means and permitting the retaining floor section to pivot downwardly on the pivotal means; and the discharge floor section is provided with cradle means mounting the discharge floor for movement from a generally horizontal case-supporting position, downwardly and forwardly with respect to the rear of the retaining floor section, to a case-discharging position.

Preferably, means are provided for returning the retaining floor section and the discharge floor section to their respective generally horizontal case-supporting positions after the escapement device has functioned to unload a single case from a stack of cases thereon. To facilitate the functioning of the escapement device for handling a plurality of stacks of cases fed thereto from a storage conveyor, holding means are preferably provided to restrain the stack or stacks of cases still on the storage conveyor from abutting the case(s) on the escapement device as long as a single case is still supported on the escapement device and to release a stack of cases from the storage conveyor to said device when the escapement device has functioned to unload the last case of the stack previously supported on the escapement device.

It will be understood that the invention is susceptible of embodiment in many and various forms, one of which is illustrated in the accompanying drawings which form a part of this specification, and that the structural details and mode of assembly herein set forth may be varied to suit particular purposes and still remain within the scope of the invention. The nature of the invention will be better understood from a consideration of the following description of said embodiment with reference to said accompany ing drawings.

In the drawings, wherein like reference numerals identify the same parts in the several thereof:

FIG. 1 is a top plan view of part of a storage conveyor provided with an automatic escapement device embodying the present invention; the composite floor of said device being shown in upper retained relationship, and part of a collection conveyor associated with the device also being shown;

FIG. 2 is a side elevational view of the storage conveyor, escapement device and collection conveyor of FIG. 1, with a stack of cases being shown in broken lines mounted on the composite floor of the escapement device, part of another stack of cases being shown in broken lines retained on the storage conveyor, and with the released and unloading position of the composite floor also being shown in broken lines adjacent the collection conveyor;

FIG. 3 is a front elevational view of the escapement device shown in FIGS. 1 and 2, with the stack of cases on the composite floor again being shown in broken lines;

FIG. 4 is a vertical cross-sectional view of the storage conveyor, escapement device and collection conveyor of the preceding Figures taken on section line 4—4 of FIG. 2, with the plurality of stacks of cases shown in broken lines, but in this case with the retaining and discharge floor sections of the composite floor shown shortly after release, and the final lowermost discharge position of the discharge floor section and the actuator mechanism therefor being shown in broken lines; and FIG. 5 is another vertical cross-sectional view of the storage conveyor, escapement device and collection conveyor similar to the view thereof in FIG. 4, but in this case, with the retaining and discharge floor sections in lowermost discharge positions, with the lowermost case of the foremost stack shown in broken lines in discharge position and already partially on the collection conveyor and with the remainder of said stack of cases in position for ultimate retention by the retaining floor sections.

Referring to FIG. 1, the escapement device 2 is shown in conjunction with a storage conveyor trackway 3 and a collection conveyor trackway 4. The escapement device 2 and storage conveyor trackway 3 share a pair of main outer supporting rails 5 which, as best seen in FIGS. 2, 4 and 5, are supported at a slight inclination downwardly from the storage conveyor end towards the escapement device end by conventional supporting means not shown for the sake of clarity.

The storage conveyor trackway 3 comprises a plurality of interior rails 6 (four are shown) supported in the inclined plane of outer supporting rails 5 by conventional supporting means similarly not shown. Rails 6 are each provided with a plurality of spindles 7 on each of which is rotatably mounted a roller 8.

Collection conveyor trackway 4 also comprises a plurality of rails 9 each having spindles 10 each with a roller 11 rotatably mounted thereon. However, as appears in FIGS. 2, 4 and 5, the rails 9 of collection conveyor trackway 4 are supported below the lowermost and foremost end of outer supporting rails 5 a distance which, as appears in FIG. 5, exceeds the vertical height of the cases c which are to be handled by the escapement device 2, for a reason which will appear hereinafter. Collection conveyor trackway 4 is also supported at a slight inclination in the direction of the inclination of supporting rails 5 of escapement device 2 and storage conveyor trackway 3 by conventional means not shown.

The escapement device 2, in this embodiment of the invention, comprises a composite floor 12, in turn comprising a retaining floor section 13 and a discharge floor section 14. Retaining floor section 13 in turn comprises a pair of separately movable inner and outer floor portions 15 and 16. Smaller inner retaining floor portion 15 comprises a pair of outer supporting rails 17 which support therebetween, on rods 18, a plurality of rotatable rollers 19. Outer rails 17 are pivotally mounted at their rear ends 20 on a rod 21 which, as appears in FIG. 2, is supported by outer supporting rails 5. As also appears in FIG. 2, as well as in FIGS. 4 and 5, each of supporting rails 17 is provided at its rear 20 with an extension 22 disposed downwardly at a right angle to the rail 17 to which it is attached.

Medially of each of said two extensions 22, there is affixed a spindle 23. A latch member 24 is pivotally mounted at its rear end 25 on each spindle 23. Latch members 24 are provided at their forward ends 26 with a detent 27, and rearwardly with a stop lug 28, which functions as a stop member upon engagement with the forward surface of the extension 22 on which the stop member 24 is mounted, as best appears in FIG. 4. Detent 27 has a downwardly and rearwardly beveled front surface 29 for a purpose which will appear hereinafter. Each latch member 24 is urged towards its respective extreme counter-clockwise position (FIGS. 4 and 5) limited by its stop lug 28, by means of a biasing leaf spring 30 attached to the front surface of the extension 22 by a bolt 31.

Each extension 22 is urged clockwise on rod 21 by a biasing spring 39 connected at one end thereof to the lowermost end of the extension 22, and at the other end thereof, to a mounting lug 40 affixed to a supporting surface 41. Thus, outer rails 17 of shorter portion 15 of retaining floor section 13 are continuously biased upwardly to the plane of outer supporting rails 5, and hence to that of rails 6 and rollers 8 of storage trackway 3. Mounted on supporting surface 32, which is located below the lowermost edges of the extensions 22, are a pair of stop bars 42 each engagable by a respective stop lug 43 affixed to the extremity of each extension 22, thereby to limit the clockwise rotation of extensions 22 and hence, the upward movement of the retaining floor portion 15 to said plane of rails 5.

Also mounted on supporting surface 32 are a pair of solenoids 33, both of which appear in FIG. 2. The coils (not visible) of said solenoids 33 are connected by a circuit 34 (shown schematically in FIG. 3) having a switch 35 biased to open position and adapted to be actuated to closed position, either by the memory system (not shown) of the particular automatic warehouse selecting mechanism chosen, or manually if desired. Solenoids 33 are each provided with the usual core pieces 36. In this instance, core pieces 36 have affixed to the upper ends thereof, the respective ends of a latch bar 37. Springs 38 function to maintain said core pieces 36 and latch bar 37 attached thereto in the raised position shown in FIGS. 2, 3 and 5, as long as solenoids 33 are not energized via circuit 34. In such raised position, latch bar 37 is engageable by the detent 27 on latch member 24 provided on each extension 22, as best seen in FIGS. 2 and 5.

The second and larger outer portion 16 of retaining floor section 13 surrounds smaller floor portion 15, but otherwise, it is similar thereto. Thus, it comprises a pair of outer rails 44, between which are mounted a plurality of rods 45, each having thereon, a plurality of rollers 46 rotatably mounted on said rods. Outer rails 44 are similarly mounted at their rear ends 47 on the same pivot rod 21 as are rails 17 of floor portion 15, and are likewise provided with downwardly extending right angled extensions 48, each provided with the identical latch mechanism and biasing means therefor of the smaller inner retaining floor portion 15, whereby the latch members of extensions 48 are also adapted for engagement with the same latch bar 37. Extensions 48 similarly have springs 39 attached to the lower ends thereof, whereby the outer retaining floor portion 13 is likewise urged in counter-clockwise direction towards the plane of the outer supporting rails 5. The foregoing idential structures, as well as the stop bars 42 and stop lugs 43 for said extensions 48, are each respectively identified by the same reference numeral used for designating said structures of inner floor portion 15.

Discharge floor 14 comprises a pair of outer rails 49 connected at their forward ends by a cross bar 50. Each outer rail 49 has a plurality of spindles 51, on each of which is rotatably mounted a roller 52. Discharge floor 14 is supported interiorly of the main outer supporting rails 5 (and exteriorly of both portions 15 and 16 of retaining floor section 13 for a purpose that will appear hereinafter) by a cradle mechanism 53.

Cradle mechanism 53 comprises a shorter pair of arms 54 and a longer pair of arms 57. Shorter arms 54 are each pivotally attached at one end thereof to a spindle 55 affixed to the outer surface of each rail 49 of discharge floor 14, and at its other end pivotally attached to a spindle 56 affixed to the inner surface of each outer rail 5 of escapement 2. Longer arms 57 are each pivotally attached at one end thereof to the forward end of a rail 49 of discharge floor 14 by a spindle 58 affixed to the outer surface of said rail 49, and at the other end by a second spindle 59 similarly fixed on the interior surface of outer rail 5, as in the case of the first pair of shorter arms 54. The spacing of the pairs of spindles 56 and 59 on rails 5 is selected to assure that discharge floor 14 swings from its uppermost position (FIGs. 1, 2 and 3), where it is in the same plane as that of retaining floor portions 15 and 16 and storage conveyor trackway 3, to a lowermost position (FIG. 5).

A stop lug 60 is affixed to the upper surface of the forward end of each rail 5 and is positioned for abutment with a longer arm 57 when it reaches said plane of escapement device 2, thereby to delimit upward movement of discharge floor 14. Similarly, a lower stop bar 61 is mounted on a supporting surface 62 and is located to be engaged by a stop lug 63 mounted on and extending downwardly from cross bar 50 which joins rails 49 of discharge floor 14, whereby the latter is halted in its downward and forward movement on cradle arms 54 and 57 at an inclination slightly greater than that of outer supporting rails 5 and with the forward end of said floor 14 in substantial alignment with the ends of rails 9 of collection conveyor trackway 4, as shown in FIGS. 2, 4 and 5.

Attached to the bottom of each of rails 49 centrally of discharge floor 14 is a depending lug 64. By said lugs 64, there is supported, below rails 49, a rod 65. Pivotally connected to the mid-point of rod 65 is the end loop 66 of a piston rod 67 of a pneumatic servo cylinder 68 having at the upper and lower ends thereof conduits 69, 70 for introducing or relieving fluid pressure on either side of the piston (not visible in cylinder 68) to which piston rod 67 is attached. Cylinder 68 is pivotally mounted at its bifurcated lower end 71 on a spindle 72 mounted in a mounting lug 73 affixed to a supporting surface 74.

As shown in FIG. 2, conduits 69 and 70 connect into a valve box 75 of conventional design to which a conduit 78 from a constant source of fluid pressure (not shown) is also connected. Valve box 75 has the usual atmospheric vent 76 and an electromagnetically rotatable plug 77 movable to a first position "A," as shown in FIG. 2. In this position, positive fluid pressure from conduit 78 is caused to enter conduit 70, while conduit 69 is vented to atmosphere via vent 76 resulting in upward movement of the piston in cylinder 68, and with it, piston rod 67, thus to raise and maintain discarge floor 14 in the uppermost position shown in full lines in FIG 2. Rotatable plug 77 is alternatively movable to position B, wherein positive fluid pressure is caused to enter conduit 69 while conduit 70 is vented to atmosphere via vent 76, thereby to result in downward movement of the piston in cylinder 68 and with it piston rod 67 and discharge floor 14 attached thereto. Rotatable plug 77 is provided with detent means (not shown) to assure maintenance of said plug in the position A or B to which it has been rotated electromagnetically, until it is caused to rotate to the other position electro-magnetically. The circuits for accomplishing said rotations of plug 77 are now described below.

As adapted to the present invention, the solenoid coil (not visible) for valve plug 77 is connected into the circuit 34 shown in FIG. 3, whereby, upon closure of switch 35, valve plug 77 is caused to turn to position B to result in discharge floor 14 being positively urged downwardly until stop lug 63 thereon abuts stop bar 61.

A trip switch 79a is provided at collector conveyor trackway 4 (FIG. 1) to protrude above the rollers 11 thereof and into the path of a case moving downwardly thereon. Trip switch 79a is biased to normally open position and controls a separate circuit 79 for the solenoid coil for valve plug 77. Thus, a case discharged from discharge floor 14 and moving on collector conveyor trackway 4 moves trip switch 79a to close circuit 79 to valve box 77, thereby to move valve plug 77 back to position A, whereupon pressure fluids flow into cylinder 68 in lower conduit 70 and discharge floor 14 is again lifted to its uppermost position in the plane of rails 5 in readiness for the next case discharge sequence.

A pair of supporting rods 80 are fixedly mounted on the outer surfaces of outer rails 5 at the front end of escapement 2. Each of supporting rods 80 has mounted on the upper region thereof, an elongate retaining bracket 81 of L-shaped cross-section, as best seen in FIG. 1. Retaining brackets 81 are spaced by supporting rods 80 to accommodate the widths of the forward ends of the cases c (FIG. 3) to be handled by the escapement device. As will be understood by those skilled in the art, L-shaped retention brackets 81 may be maintained in the position and in the relationship shown, by the use of additionally strengthening mounting means, which are not shown, again for purposes of clarity. Mounted at the lower end of one of the L-shaped bracket members 81 (to the left, as viewed in FIG. 3) is a switch box 82. Switch box 82 has a downwardly directed switch member 83 which is provided with means (not shown) normally biasing it outwardly to switch closed position. Switch member 83 extends to a location above the plane of the escapement device 2 and storage conveyor trackway 3, whereby switch member 83 is adapted to be engaged by and pushed against said biasing means to switch open position by the lowermost case on the escapement device (FIG. 2) or the case descending downwardly thereabove (FIG. 4). As will be obvious, switch member 83 will be permitted to be biased outwardly to normal switch closing position when the last case in the stack is dropping to discharge on the discharge floor, as would be the situation in FIG. 4 if there were no cases above the one moving downwardly and forwardly to discharge. Switch box 82 controls a circuit 84 (FIG. 3) for energizing the two pairs of solenoids 85 and 86 for the purposes that will appear from the description that follows.

The first pair of solenoids 85 are affixed to supporting surfaces 87 and have mounted on the core pieces 88 thereof for movement therewith, another pair of L-shaped retention bracket members 89 similar to the pair 81, 81 permanently mounted at the front end of the escapement device 2. Core pieces 88 are normally biased toward each other by springs 90. Thus, upon energization of the coils (not shown) of solenoids 85 when circuit 84 is closed through switch box 82, core pieces 88 are pulled into solenoids 85 against biasing springs 90 thereby to move bracket members 89 further apart from each other.

The second pair of solenoids 86 have mounted on their core pieces 91 a pair of abutment bars 92 which are adapted to engage frictionally the sides of cases c adjacent thereto to retard the movement of the cases on inclined storage conveyor trackway 3. In the case of this pair of solenoids 86, the core pieces 91 are normally biased outwardly in the direction away from each other by springs 92. Thus, abutment bars 92 are normally maintained further apart from each other and out of engagement with cases on trackway 5, as shown in FIG. 1. Solenoids 86 are also connected into circuit 84, as indicated schematically in FIG. 1. Thus, upon energization of solenoids 86, as when switch member 83 is permitted to move to switch closing position in the absence of any case on escapement device 2, core pieces 91 of solenoids 86 are pulled into the coils thereof against biasing springs 92, thereby to urge abutment bars 92 towards each other and hence into frictional engagement with any stack of cases positioned therebetween at the time.

In the operation of the device described, prior to the loading thereof with the cases to be discharged one at a time, the retaining floor portions 15 and 16 will be biased by springs 39 in a clockwise direction (as seen in FIG. 2) until the stop lugs 43 on respective extensions 22 and 48 engage the stop bar 42 to position the retaining floor portions 15 and 16 in the plane of the escapement device 2 and storage conveyor trackway 3. During such positioning, the beveled front surfaces 29 of latch members 24 will have ridden on and over latch bar 37 (now in uppermost position) until detent 27 snapped past latch bar 37 to engage the same (FIG. 2). Similarly, discharge floor 14 will have been raised to and maintained in uppermost horizontal position in engagement with stop lugs 60 on outer rails 5 by introduction of fluid pressure via valve plug 77 (in position A due to prior tripping of trip switch associated with trackway 4) and lower conduit 70, into cylinder 68 below the piston therein attached to piston rod 67. With the discharge and retaining floor sections 13 and 14 in said position, the escapement device 2 and storage conveyor trackway 3 may now be loaded with the cases c to be stored and dispensed singly on demand.

In loading the device 2 and trackway 3, a first stack of cases is positioned to be supported entirely on the composite floor 12 of the escapement device 2. Specifically, as appears in broken lines in FIG. 1, the outer edges of the lowermost case c adjacent rails 5 are supported on rollers 52 mounted on rails 49 of discharge floor 14, and the central and rearward portions of the case are supported by the retaining floor portions 13 and 15, respectively, of retaining floor section 12. This lowermost case and the cases comprising the remainder of the stack thereon are maintained in position, despite the inclination of escapement device 2, by the L-shaped bracket members which engage and retain the stack, as appears in FIG. 2. In such relationship of parts, the lowermost case engages and biases switch member 83 to switch open position, thereby breaking circuit 84 to solenoid pairs 85 and 86.

Solenoids 85 being de-energized at this time, core pieces 88, and with them their respective L-shaped brackets 89, are urged towards each other by biasing springs 90 on said core pieces 88. Retention brackets 89 may then be pushed apart manually, or otherwise, against the biasing action of springs 90 to permit the insertion of the lowermost case therebetween and on rollers 8 (FIG. 1). Thereafter, the additional cases of the stack may easily be placed one on top of the other (FIG. 2). Another stack of cases may then be positioned on storage conveyor trackway 3 between, but not in abutment with, the presently spring-biased, spaced-apart, abutment bars 92. Preferably, this second stack is loaded to be in abutment with the stack retained by L-shaped brackets 89, as shown in broken lines in FIGS. 1 and 4. As will be apparent, succeeding stacks may be loaded behind those shown in the drawings to the extent of the storage conveyor trackways 3 provided for such purpose.

Upon demand of the memory system of the automatic warehouse in use, or manually in certain instances, switch 35 is actuated to close circuit 34. Solenoids 33 are energized to pull core pieces 36 downwardly against biasing springs 38, thereby to withdraw latch bar 37 from engagement with detents 27 of latch members 24 to free the latter. The closing of circuit 34 simultaneously energizes the electro-magnetic coil associated with valve plug 77 to cause the latter to move to position B at which conduit 69 is connected to the source of fluid pressure and conduit 70 is vented to atmosphere.

The weight of the cases on escapement device 2 causes downward pivoting of both the now-released retaining floor portions 15 and 16 against biasing springs 39, the strength of which are selected to permit such occurrence. At the same time, discharge floor 14 is pushed downwardly by said weight of the cases in controlled manner by the positive withdrawal of piston rod 67 as fluid pressure builds up in cylinder 68 above the piston therein and is reduced therebelow.

The lowermost case initially moves substantially downwardly, and with it, the cases thereabove, as discharge floor 14 begins its downward movement. Thereafter, due to the cradling action of arms 54 and 57; floor 14 and the lowermost case thereon begin to have a forward component of motion, as appears in full lines in FIG. 4. The remaining cases of the stack, however, continue to move downwardly only, since they are guided in this direction by L-shaped brackets 81. As also appears in FIG. 4, retaining floor portions 15 and 16 continue to pivot downwardly while only the rear lower end of the case is, at this time, engaged by said retaining floor portions 15 and 16. The case is now substantially entirely supported at its outside edges on rollers 52 of discharge floor 14.

As the case and discharge floor 14 move further downwardly, the rear lower end of the case no longer abuts the shorter floor portion 15 of retaining floor section 13. Hence, the biasing action of spring 39 connected to extension 22 causes clockwise rotation of extension 22, and with it floor portion 15, until detent 27 of latch member 24 again rides over, and then snaps into engagement with, latch bar 37, while stop lug 43 engages stop bar 42 to halt clockwise pivoting of the parts at the time smaller floor portion 15 is again locked in the plane of the escapement device 2 (FIG. 5).

As the lowermost case continues its downwardly and forwardly directed movement with discharge floor 14, the upper rear corner of the case provides a support for the forward end of the case thereabove, while the now locked retaining floor portion 15 provides support for the rear end of said case (FIG. 5). When the case moves sufficiently forward on discharge member 14 and onto collection conveyor trackway 4, the longer retaining floor portion 16 is then cleared and swings in clockwise direction under the biasing action of springs 39 until it too reaches and is locked in the plane already achieved by the smaller retaining floor portion 15, as just described previously. Thus, with the major length of the lowermost case sufficiently supported, the case being discharged by discharge floor 14 is free to continue its movement onto trackway 4, while the cases remaining in the escapement device 2 are maintained in position for the next discharge sequence. With the discharging case cleared of discharge floor 14 and passing over trip switch 79 in trackway 4 to urge the former to circuit-closing position, valve plug 77 is electro-magnetically rotated back to position A, whereby pressure fluid is again admitted through lowermost conduit 70 in cylinder 68 while conduit 69 is vented to atmosphere. Thusly, the piston and with it piston rod 67 and discharge floor 14 are again raised until floor 14 engages stop lugs 60, at which time discharge floor 14 is again in engagement with the now lowermost case of the stack of cases supported on the escapement device 2 and is ready for the next case-discharging sequence on demand.

The above-described sequence is repeated upon each demand for a case until the stack of cases on escapement device 2 is exhausted. At such time, when the last case of the stack clears outwardly biased switch member 83, the latter moves outwardly to close switch 82, whereby the two pairs of solenoids 85 and 86 are energized. Solenoids 85 function to retract L-shaped retention brackets 89, whereas solenoids 86 function to extend abutment bars 92. This permits the stack of cases formerly retained by brackets 89 to move downwardly on rollers 8 under the force of gravity. At the same time, extended abutment bars 92 retain the next stack of cases (and all those behind on trackway 3) from moving with the first-mentioned stack of cases. The latter, however, continues to move forwardly and downwardly until it abuts L-shaped members 81 of escapement device 2, at which time switch member 83 is again pushed by the lowermost case of the stack to switch-open position. With solenoids 85 and 86 thus de-energized, springs 90 urge core pieces 88 with L-shaped brackets 89 thereon toward each other to provide an ultimate stop for the next stack of cases now permitted to move downwardly on trackway 3 because of the spring biased withdrawal of abutment bars 92.

The foregoing sequence of operations may continue as long as stacks of cases are supplied to the escapement device and until the last case is discharged therefrom in response to a demand therefor.

While a preferred embodiment of the invention has been described above, it will be understood that various changes in said embodiment may be made within the scope of what is claimed without departing from the spirit of the invention. Merely, by way of example, the retaining floor section may comprise either only one or more than two separately pivoting portions depending upon the size of the cases being handled. The structure of the latching and biasing means for the retaining floor section may be varied. The discharge floor may be reset by other than electrically controlled pneumatic means. Other sensing means may be utilized for permitting feeding of an additional stack of cases to the escapement device. The inclinations of the storage conveyor trackway, escapement device discharge floor when in discharging position, and/or the collection conveyor trackway may be varied. In this connection, means may be supplied for augmenting the force of gravity in moving the cases on the several structures.

Obviously, many other changes will suggest themselves to those skilled in the art, whereby the primary advantages of the invention may still be enjoyed.

I claim:
1. An automatic escapement device for a stack of cases, said device comprising:
    a composite floor adapted to support a stack of cases, said composite floor comprising:
        (a) a retaining floor section and a juxtaposed discharge floor section in operative association with said retaining floor section;
        (b) pivotal means mounting said retaining floor section at the rear thereof;
        (c) releasable locking means for maintaining said retaining floor section in upper, generally horizontal case-supporting position;
        (d) actuatable means for releasing said locking means and permitting said retaining floor section to be pivoted downwardly on said pivotal means; and
        (e) cradle means mounting said discharge floor section for movement from an upper generally horizontal position in juxtaposition with said retaining floor section when the latter is in said generally horizontal case-supporting position, downwardly and forwardly with respect to said rear of said retaining floor section while maintaining the generally horizontal disposition.

2. An automatic escapement device as defined in claim 1 wherein said retaining floor section comprises a plurality of separately pivotable floor portions of differing lengths.

3. An automatic escapement device for a stack of cases, said device comprising:
  (A) a composite floor adapted to support a stack of cases, said composite floor comprising:
    a retaining floor section and a juxtaposed discharge floor section in operative association with said retaining floor section;
      (1) said retaining floor section comprising:
        (a) a plurality of separate floor portions of differing lengths,
        (b) pivotal means mounting said retaining floor portions at the rear ends thereof,
        (c) biasing means urging said retaining floor portions toward an upper generally horizontal position,
        (d) releasable locking means for maintaining said retaining floor portions in the upper, generally horizontal position,
        (e) actuatable means for releasing said locking means and permitting said retaining floor portions to be pivoted downwardly on said pivotal means;
      (2) said discharge floor section comprising:
        (a) supporting portions adapted to be positioned exteriorly of the widths of said retaining floor portions,
        (b) cradle means mounting said supporting portions of said discharge floor section for movement from the upper generally horizontal position of said retaining floor portions in juxtaposition with said retaining floor section downwardly and forwardly with respect to said rear ends of said retaining floor portions while maintaining a generally horizontal disposition; and
  (B) retaining means mounted above the forward end of said composite floor for maintaining a stack of cases thereon.

4. An automatic escapement device as defined in claim 3 wherein said pivotal means for said plurality of separate floor portions comprise a common pivotal axis.

5. An automatic escapement device as defined in claim 3 wherein said actuatable releasing means for said releasable locking means comprise a common locking bar.

6. An automatic escapement apparatus for a stack of cases, said apparatus comprising:
  (A) a composite floor, said composite floor comprising:
    a retaining floor section and a discharge floor section,
      (1) said retaining floor section comprising:
        (a) a plurality of separate floor portions of differing lengths,
        (b) pivotal means mounting said retaining floor portions at the rear ends thereof,
        (c) biasing means urging said retaining floor portions toward an upper generally horizontal position,
        (d) releasable locking means for maintaining said retaining floor portions in the upper generally horizontal position,
        (e) actuatable means for releasing said locking means and permitting said retaining floor portions to be pivoted downwardly on said pivotal means;
      (2) said discharge floor section comprising:
        (a) a pair of supporting portions,
        (b) each of said pair of supporting portions being positioned outside of said separate retaining floor portions and on either side thereof respectively,
        (c) cradle means mounting said supporting portions of said discharge floor section for movement from the upper generally horizontal position of said retaining floor portions, downwardly and forwardly with respect to said rear ends of said retaining floor portions, to a lower position;
  (B) retaining means mounted above the forward end of said composite floor for maintaining a stack of cases thereon;
  (C) a collector conveyor trackway,
      (1) said collector conveyor trackway being positioned below the upper generally horizontal positions of said retaining floor portions and said discharge floor section, and
      (2) said trackway also being positioned forwardly with respect to the upper generally horizontal position of said pair of supporting portions of said discharge floor section for alignment with said pair of supporting portions when the latter has moved to the lower position thereof.

7. An automatic escapement device as defined in claim 6 wherein stop means are provided for halting said retaining floor portions in the upper, generally horizontal position toward which said biasing means urge said floor portions.

8. An automatic escapement device as defined in claim 6 wherein first stop means are provided for halting said pair of supporting portions of said discharge floor section in the upper, generally horizontal position to which said portions are movable, and second stop means are provided for halting said supporting portions in the lower position to which said portions are movable.

9. An automatic escapement device as defined in claim 8 wherein lifting means are provided for positively moving said pair of supporting portions of said discharge floor section from the lower position thereof to the upper, generally horizontal position thereof.

10. An automatic escapement device as defined in claim 9 wherein actuatable means are provided which are responsive to discharging of a case by said discharge floor section for rendering said lifting means operative.

11. An automatic escapement device as defined in claim 10 wherein said actuatable means comprise trip means provided in association with said collector conveyor trackway in the path of the cases carried thereby.

12. An automatic escapement apparatus for a stack of cases, said apparatus comprising:
 (A) a composite floor, said composite floor comprising: a retaining floor section and a discharge floor section,
  (1) said retaining floor section comprising:
   (a) a plurality of separate floor portions of differing lengths,
   (b) pivotal means mounting said retaining floor portions at the rear ends thereof,
   (c) biasing means urging said retaining floor portions toward an upper generally horizontal position,
   (d) releasable locking means for maintaining said retaining floor portions in the upper generally horizontal position,
   (e) actuatable means for releasing said locking means and permitting said retaining floor portions to be pivoted downwardly on said pivotal means;
  (2) said discharge floor section comprising:
   (a) a pair of supporting portions,
   (b) each of said pair of supporting portions being positioned outside of said separate retaining floor portions and on either side thereof respectively,
   (c) cradle means mounting said supporting portions of said discharge floor section for movement from the upper generally horizontal position of said retaining floor portions, downwardly and forwardly with respect to said rear ends of said retaining floor portions, to a lower position;
 (B) retaining means mounted above the forward end of said composite floor for maintaining a stack of cases thereon;
 (C) a storage conveyor trackway,
  (1) said storage conveyor trackway being generally horizontally disposed and in operative aligned association with said composite floor for supplying stacks of cases thereto; and
 (D) a collector conveyor trackway,
  (1) said collector conveyor trackway being positioned below the upper generally horizontal positions of said retaining floor portions and said discharge floor section, and
  (2) said trackway also being positioned forwardly with respect to the upper generally horizontal position of said pair of supporting portions of said discharge floor section for alignment with said pair of supporting portions when the latter has moved to the lower position thereof.

13. An automatic escapement apparatus as defined in claim 12 wherein actuatable means are provided which are responsive to the absence of a case on said composite floor for rendering said storage conveyor trackway operative to supply a single stack of cases thereon to said composite floor.

14. An automatic escapement apparatus as defined in claim 12 wherein said composite floor when in upper, generally horizontal position, said discharge floor section when in lower position, said storage conveyor trackway, and said collector conveyor trackway, are each disposed at a forward and downward inclination.

15. An automatic escapement apparatus as defined in claim 13 wherein said last-named actuatable means comprise retractable holding means overlying said storage conveyor trackway.

16. An automatic escapement apparatus as defined in claim 15 wherein said last-named actuatable means also comprise extensible holding means overlying said storage conveyor trackway in a region thereof removed rearwardly from the region in which said retractable means are located.

17. An automatic escapement apparatus as defined in claim 16 wherein said retractable holding means and said extensible holding means are operative simultaneously upon responsiveness of said last-named actuatable means.

18. An automatic escapement device as defined in claim 14 wherein said cradle means comprise a first shorter pair of arms each pivotally attached at one end thereof to a support therefor and at the other end thereof to the rear end of said discharge floor section, and a second longer pair of arms each pivotally attached at one end thereof to a support therefor and at the other end thereof to the front end of said discharge floor section.

References Cited by the Examiner

UNITED STATES PATENTS

| | | | |
|---|---|---|---|
| 1,632,203 | 6/1927 | Threefoot et al. | |
| 2,338,714 | 1/1944 | Garner | 221—16 |
| 2,916,186 | 12/1959 | Deland | 221—106 |
| 2,941,643 | 6/1960 | Donnelly | 321—295 X |
| 3,175,728 | 3/1965 | Lindsey et al. | 221—15 |

ROBERT B. REEVES, *Primary Examiner.*

KENNETH N. LEIMER, *Examiner.*